US005885179A

United States Patent [19]

Lewis et al.

[11] Patent Number: 5,885,179

[45] Date of Patent: Mar. 23, 1999

[54] HYDRAULIC TENSIONER WITH GROOVED RESERVOIR COVER

[75] Inventors: Jeffrey H. Lewis, Freeville; Samuel F. Isabel, Dryden, both of N.Y.

[73] Assignee: Borg-Warner Automotive, Inc., Sterling Heights, Mich.

[21] Appl. No.: 824,823

[22] Filed: Mar. 26, 1997

[51] Int. Cl.[6] .................... F16H 7/22; F16H 7/08

[52] U.S. Cl. .................... 474/110; 474/111

[58] Field of Search .................... 424/91, 101, 109, 424/110, 111, 113, 114, 115, 116, 117, 133, 134, 135, 136, 137, 138

[56] References Cited

U.S. PATENT DOCUMENTS

| | | | |
|---|---|---|---|
| 3,964,331 | 6/1976 | Oldfield | 74/242.1 FP |
| 4,190,025 | 2/1980 | Wahl | 123/90.31 |
| 4,909,777 | 3/1990 | Inoue et al. | 474/110 |
| 5,087,225 | 2/1992 | Futami et al. | 474/91 |
| 5,181,889 | 1/1993 | Maruyama et al. | 474/110 |
| 5,352,159 | 10/1994 | Suzuki et al. | 474/110 |
| 5,441,457 | 8/1995 | Tsutsumi et al. | 474/110 |
| 5,597,367 | 1/1997 | Trzmiel et al. | 474/110 |
| 5,628,701 | 5/1997 | Dembosky et al. | 474/110 |
| 5,630,767 | 5/1997 | Hirabayashi et al. | 474/110 |

FOREIGN PATENT DOCUMENTS

| | | |
|---|---|---|
| 0756108 | 1/1997 | European Pat. Off. . |
| 2526908 | 11/1993 | France . |
| 4202775 | 8/1992 | Germany . |
| 2137726 | 10/1984 | United Kingdom . |

OTHER PUBLICATIONS

EPO Search Report for Application No. EP 98301489.5, dated Jul. 27, 1998.

*Primary Examiner*—Charles A. Marmor
*Assistant Examiner*—Matthew A. Kaness
*Attorney, Agent, or Firm*—Sidley & Austin; Greg Dziegielewski

[57] ABSTRACT

A hydraulic tensioner that uses a dimpled or grooved section in the cover plate to provide lubrication without the loss of oil pressure. The dimple directs a jet or spray of oil onto the chain as it runs by the tensioner. The cover plate also includes a depression, which extends down into the reservoir to add strength to the cover plate by stiffening.

6 Claims, 4 Drawing Sheets

12
2
2
10
27
26
15

2
21
11
20
3
19
17
4
7
6
5
9
29
8
18
22

11
2
1
14
16
12
13
29

112
100
100
9
9
127
111
126

52
121
117
111
120
53
119
54
57
56
55
59
129
118
122
58

111
52
116
114
51
112
129

HYDRAULIC TENSIONER WITH GROOVED RESERVOIR COVER

BACKGROUND OF THE INVENTION

This invention relates to a tensioner used with a chain drive in an automotive timing application. More particularly, this invention relates to a tensioner that uses a dimpled or grooved section in the cover to provide lubrication without the loss of oil pressure.

Chain tensioning devices, such as hydraulic chain tensioners, are typically used as a control device for a chain drive system in an automobile timing system. Generally, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing damage. The tension in the chain may vary greatly due to the wide variation in the temperature and the linear thermal expansion among the various parts of the engine. Camshaft and crankshaft induced torsional vibrations cause chain tension to vary considerably. This tension variation results in chain elongation. Moreover, wear to the chain components during prolonged use can produce a decrease in the tension of the chain.

A hydraulic tensioner is used to take up the slack in the chain or belt that connects the camshafts to the crankshaft of the engine timing system or to tension the secondary chain that connects two camshafts in a dual overhead cam engine. A typical hydraulic tensioner is comprised of a housing having a bore, a fluid chamber defined by the bore, and a hollow piston biased in a protruding direction from the bore by a spring. A check valve is also included in the hydraulic tensioner to permit fluid flow from a source of pressurized fluid into the fluid chamber, while preventing back flow in the reverse direction. The force of the chain against the piston in an inward direction is balanced by the resistance force of the fluid and force of the spring in an outward direction.

Oil is supplied to the tensioner from a reservoir through the check valve. While the reservoir includes an opening to allow oil feed into the reservoir, other openings in the reservoir are typically closed by a plug that is press-fit into an opening to the exterior of the tensioner housing. The problems with the press-fitted plug in the reservoir are that the volume capacity of the reservoir is reduced and the reservoir is filled through an opening below the lower surface of the plug. Thus, flat plates or raised plates have been used as reservoir covers.

One example of a chain tensioner that utilizes such reservoir covers is described in Tsutsumi et al., U.S. Pat. No. 5,441,457, where a reservoir is formed as a hollow space in the housing and a flat or convex cover plate covers the reservoir. Oil is supplied through an oil supply bore. With a flat plate, the reservoir volume is equal to that of the hollow space within the housing. A convex cover plate, with its concave side facing the interior of the reservoir, provides a volume in the reservoir equal to the reservoir space formed within the housing plus the volume of the concave part of the plate. A small hole in the center of the plate permits air to escape from the top of the reservoir. If oil leaks out from the small hole, then it will flow back into the oil pan by gravity.

Similarly, in the present invention, the reservoir is formed within the tensioner housing and has a plate cover. However, the tensioner of the present invention has a depression in a flat cover that stiffens the flat plate. The depression does not contact the walls of the reservoir, but is provided in the center for strength purposes. An opening in the plate guides a jet or spray of oil from the reservoir onto the chain as it runs by the tensioner and also allows air to vent or escape from the reservoir.

SUMMARY OF THE INVENTION

The present invention is directed to a tensioner that uses a dimpled or grooved section in the cover to provide lubrication without the loss of oil pressure.

In the first embodiment of the present invention, the hydraulic tensioner includes a housing having a bore defining a fluid chamber and a hollow piston slidably received within the bore. The piston fits into a face plate, which has a plastic portion that contacts a chain. The piston may include a seal ring within a groove that ensures proper controlled leakage of the chamber. A spring is located within the bore and biases the piston in a protruding direction from the bore.

A check valve is also provided between the chamber and an oil reservoir to permit fluid flow from the reservoir through an oil supply inlet into the chamber, while blocking flow in the reverse direction. A passage in the housing connects the oil supply inlet with the reservoir.

A cover plate is fixed to the housing by a rivet and covers the opening of the reservoir. The cover plate includes a depression, which extends down into the reservoir to add strength to the cover plate by stiffening. The cover plate also includes a raised dimple at the sealing edge of the top of the reservoir. The dimple directs a jet or spray of oil onto the chain as it runs by the tensioner. The squirt of oil provides lubrication of the chain without the loss of oil pressure in the tensioner.

In a second embodiment of the present invention, the cover plate is rectangular. The cover plate includes a depression, which is located within the middle of the cover plate along its length, and a dimple, which is perpendicular to the depression.

DETAILED DESCRIPTION OF THE PREFERRED EMBODIMENTS

Figure 1:
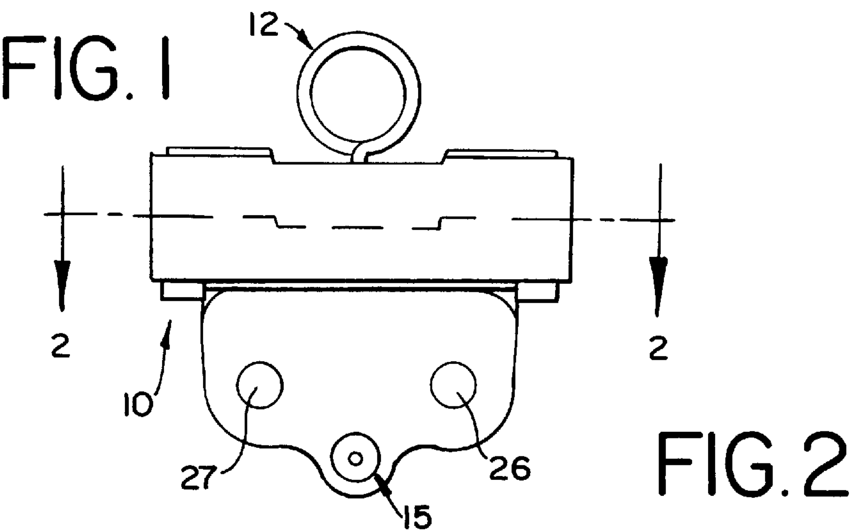
FIG. 1 is a bottom view of the first embodiment of the hydraulic tensioner.
Figure 2:
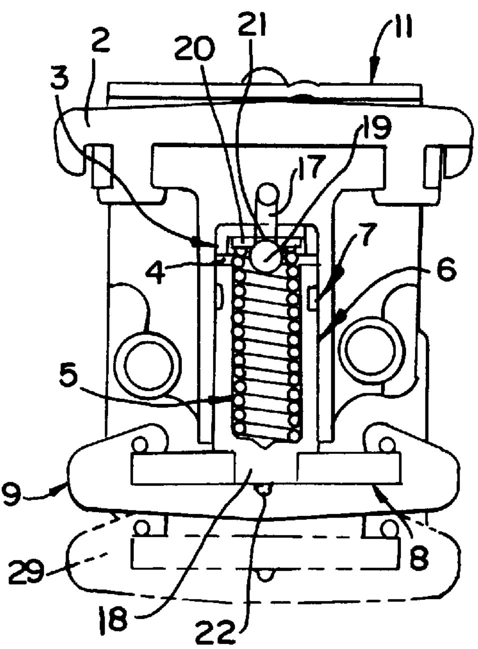
FIG. 2 is a sectional view of the hydraulic tensioner of FIG. 1 taken along line 2—2.
Figure 3:
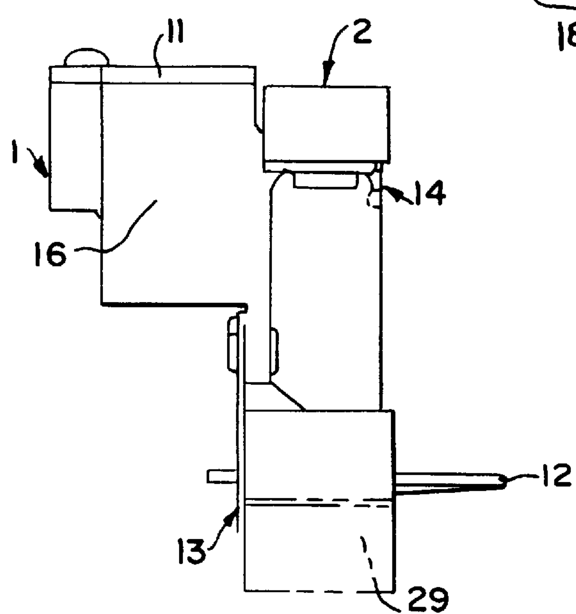
FIG. 3 is a side view of the first embodiment of the hydraulic tensioner.
Figure 4:
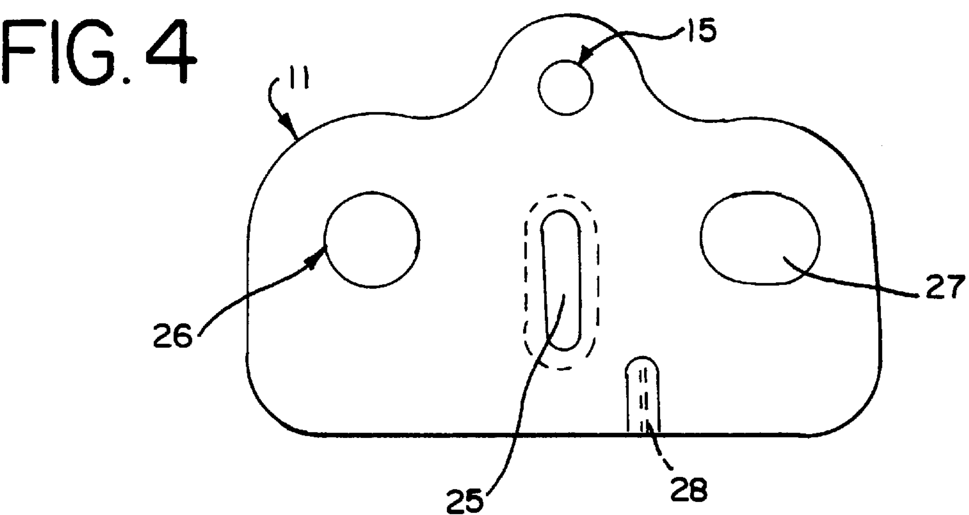
FIG. 4 is a top view of the cover plate of the hydraulic tensioner of FIGS. 1–3.
Figure 5:
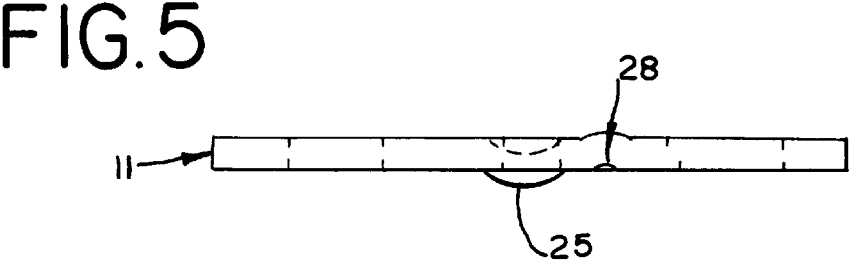
FIG. 5 is a side view of the cover plate of the hydraulic tensioner of FIGS. 1–3.
Figure 6:
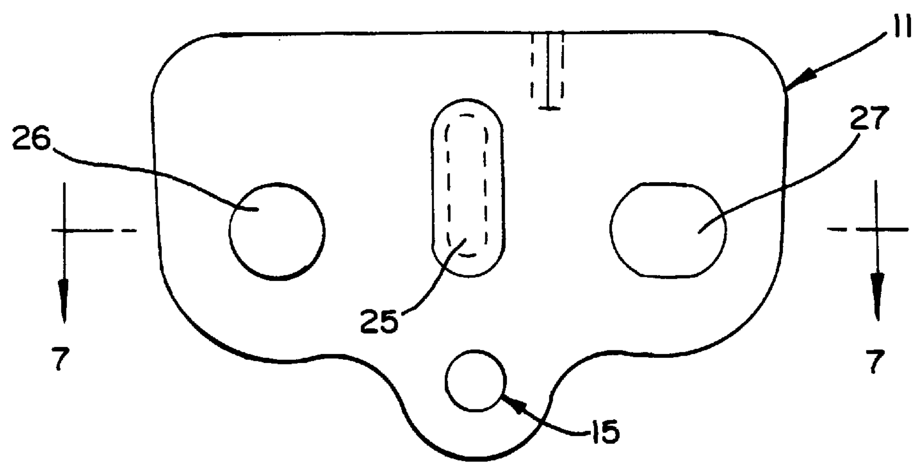
FIG. 6 is a bottom view of the cover plate of it the hydraulic tensioner of FIGS. 1–3.
Figure 7:
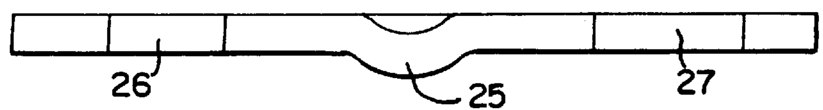
FIG. 7 is a sectional view of the cover plate of FIG. 5 taken along line 7—7.

FIGS. 1–3 illustrate a hydraulic tensioner 10, or secondary tensioner, which tensions the chain that connects the camshafts of a right hand bank of cylinders in a dual overhead camshaft, V-block engine. The tensioner 10 includes a housing 1 with a cover plate 11 secured to the tensioner with a rivet 15. The cover plate 11, having a rectangular shape with a bracketed side, is connected to the engine by mounts 26 and 27. A snubber 2 is located at the bottom of tensioner 10 to contact a chain. A plug 14 is located at the front of the tensioner 10 above the snubber 2, and a backing plate 13 is located at the back of the tensioner 10. A chamber 4 is filled with fluid through a passageway 17 from a reservoir 16 integrally formed within the housing 1. The chamber 4, preferably cylindrical, receives a hollow piston 6, also preferably cylindrical, having an upper end 18. The upper end 18 fits into a face plate 8, which holds a plastic member 9. The member 9 contacts the chain to provide tension along the chain strand. The face plate 8 is press fit onto the piston 6. The member 9 slides onto the face plate 8 and is connected to the face plate 8 with backing plate 13. A retaining pin 12 fits into a slot 22 during transport and installation, after which it is removed. A spring 5 contacts the inside of the upper end 18 of the piston 6 to bias the piston 6 in a protruding or outward direction. As shown in FIG. 2, as the piston 6 protrudes, the member 9 will move away from the tensioner 10 to an outward position 29. In addition, piston 6 has a groove that holds a seal ring 7. The seal ring 7 ensures proper controlled leakage of the chamber 4.

A check valve 3 is provided between the chamber 4 and the passageway 17 to the source of pressurized fluid to permit fluid flow into the chamber 4, while blocking fluid flow in the reverse direction. The check valve 3 includes a ball 19 and spring 20 biasing the ball toward a ball seat 21. The check valve may be a variable orifice check valve as shown and described in U.S. Pat. No. 5,259,820 and U.S. Pat. No. 5,277,664, both of which are owned by the assignee of the present application and both of which are incorporated herein by reference.

During start up, without fluid in the fluid chamber 4, fluid from the reservoir 16 enters through passageway 17 and fills up the chamber 4. As the chamber 4 fills with fluid, the piston 6 moves outward from the chamber 4 due to the force of the spring 5 and the pressure of the fluid supplied by the reservoir 16. Fluid continues to fill the chamber 4 until the inward force of the chain on the member 9 and piston 6 is balanced by the outward reaction force of the spring 5 and the fluid in the chamber 4. At this point, the check valve 3 closes and prevents further fluid flow.

Oil from the chain will flow into the opening at the back of the housing 1, at the opposite end of the mount 27 of the cover plate 11. As the oil flows through the opening and reaches the cover plate 11, it will fill the reservoir 16. At the bottom of the reservoir 16, opposite the top of the reservoir 1 having the cover plate, oil will flow to passageway 17 to check valve 3.

Cover plate 11 is fixed to housing 1 and covers the opening of the reservoir 16. As shown in FIGS. 4–7, cover plate 11 has a depression 25 that extends into the reservoir 16 to add strength to the cover plate 11 by stiffening. This depression 25 is located within the middle along the width of the cover plate 11 and does not contact the walls of the reservoir 16 to retain the cover plate 11. A raised dimple 28 is located at the sealing edge of the top of the reservoir 16 and cover plate 11. The dimple 28 directs a jet of oil onto the chain as it runs by the tensioner 10. The jet of oil provides lubrication of the chain without the loss of oil pressure in the tensioner 10.

Figure 8:
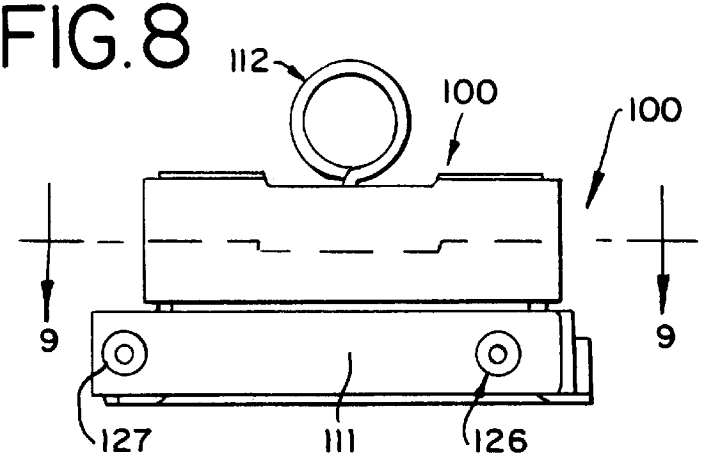
FIG. 8 is a top view of the second embodiment of the hydraulic tensioner.
Figure 9:
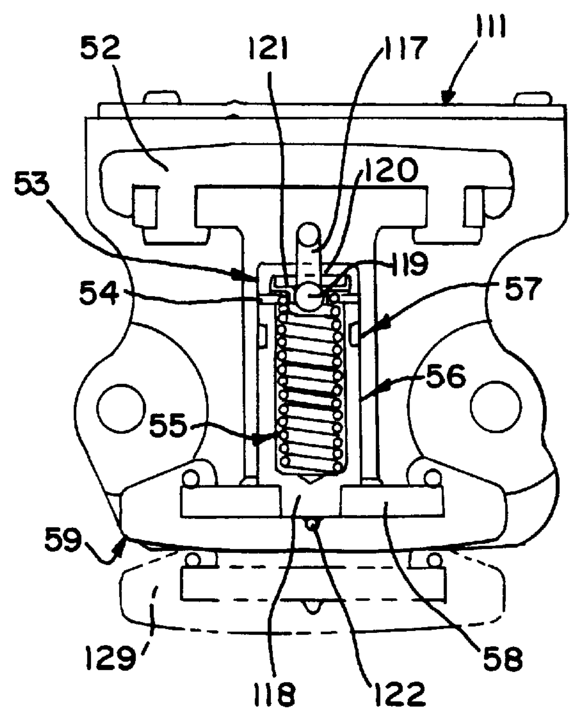
FIG. 9 is a sectional view of the hydraulic tensioner of FIG. 8 taken along line 9—9.
Figure 10:
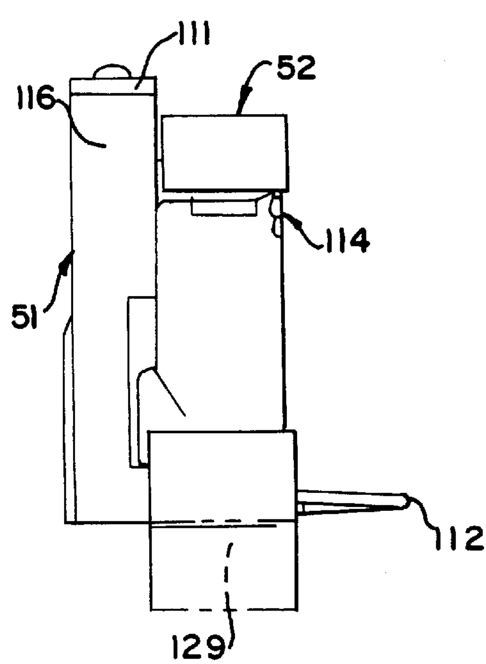
FIG. 10 is a side view of the second embodiment of the hydraulic tensioner.
Figure 11:
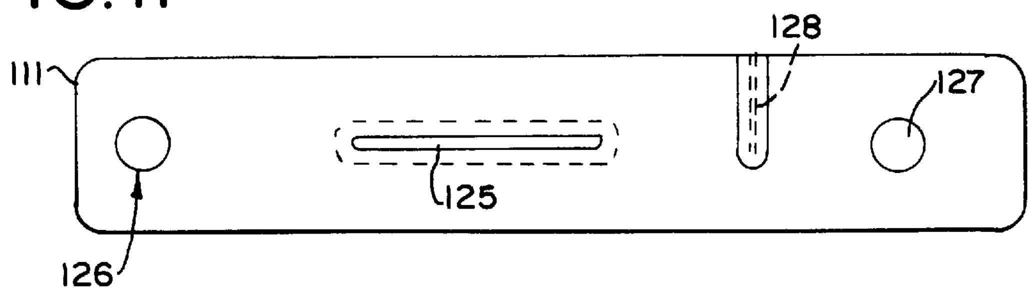
FIG. 11 is a top view of the cover plate of the hydraulic tensioner of FIGS. 8–10.
Figure 12:
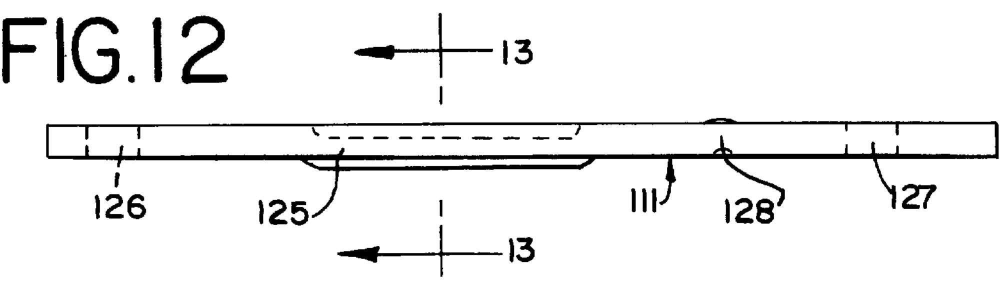
FIG. 12 is a side view of the cover plate of the hydraulic tensioner of FIGS. 8–10.
Figure 13:
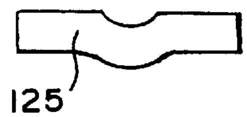
FIG. 13 is a sectional view of the depression of FIG. 12 taken along line 13—13.
Figure 14:
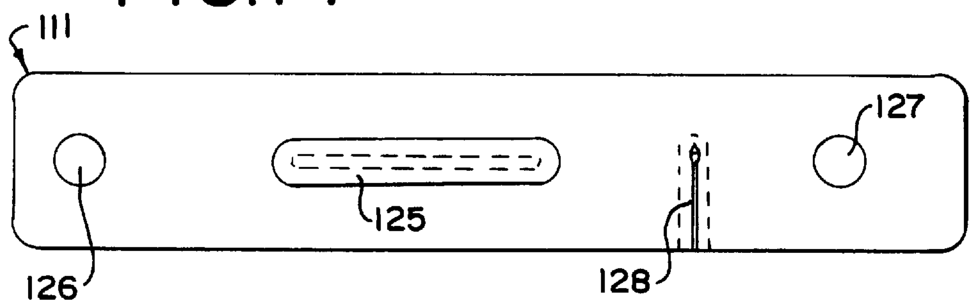
FIG. 14 is a bottom view of the cover plate of the hydraulic tensioner of FIGS. 8–10.
Figure 15:
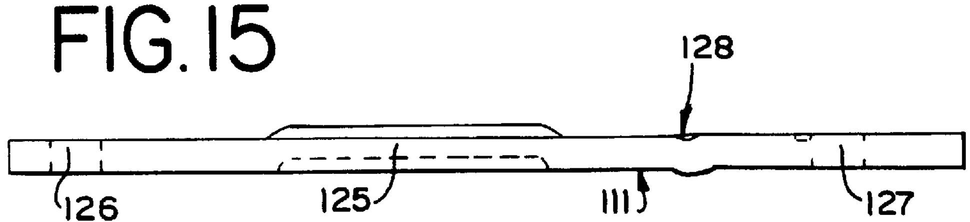
FIG. 15 is an opposite side view of the cover plate of FIG. 12.

FIGS. 8–10 illustrate a hydraulic tensioner 100 for a left hand bank of cylinders in a V-block engine. The tensioner 100 includes a housing 51 with a cover plate 111, which has a rectangular shape. A snubber 52 is located at the bottom of tensioner 100 to contact a chain. A plug 114 is located at the front of the tensioner 100 above the snubber 52. A chamber 54 is filled with fluid through a passageway 117 from a reservoir 116 integrally formed within the housing 51. The chamber 54, preferably cylindrical, receives a hollow piston 56, also preferably cylindrical, having an upper end 118. The upper end 118 fits into a face plate 58, which holds a member 59. The member 59 contacts the chain to provide tension along the chain strand. The id face plate 58 is press fit onto the piston 56. A retaining pin 112 fits into a slot 122 during transport and installation, after which it is removed. A spring 55 contacts the inside of the upper end 118 of the piston 56 to bias the piston 56 in a protruding or outward direction. As shown in FIG. 2, as the piston 56 protrudes, the member 59 will move away from the tensioner 100 to an outward position 129. In addition, piston 56 has a groove that holds a seal ring 57. The seal ring 57 ensures proper controlled leakage of the chamber 54.

A check valve 53 is provided between the chamber 54 and the passageway 117 as the source of fluid pressure to permit fluid flow into the chamber 54, while blocking fluid flow in the reverse direction. The check valve 53 includes a ball 119 and spring 120 biasing the ball toward a ball seat 121.

During start up, without fluid in the fluid chamber 54, fluid from the reservoir 116 enters through passageway 117 and fills up the chamber 54. As the chamber 54 fills with fluid, the piston 56 moves outward from the chamber 54 due to the force of the spring 55 and the pressure of the fluid supplied by the reservoir 116. Fluid continues to fill the chamber 54 until the inward force of the chain on the member 59 and piston 56 is balanced by the outward reaction force of the spring 55 and the fluid in the chamber 54. At this point, the check valve 53 closes and prevents further fluid flow.

Oil from the chain will flow into an opening at the back of the housing 51, at the opposite end of the mount 127 of the cover plate 111. As the oil flows through the opening and reaches the cover plate 111, it will fill the reservoir 116. At the bottom of the reservoir 116, opposite the top of the reservoir 61 having the cover plate, oil will flow to passageway 117 to check valve 53.

Cover plate 111 is fixed to housing 51 and covers the opening of the reservoir 116. As shown in FIGS. 11–15, cover plate 111 has a depression 125 that extends down into the reservoir 116 to add strength to the cover plate 111 by stiffening. This depression 125 is located within the middle and along the width of the cover plate 111 and does not contact the walls of the reservoir 116 to retain the cover 111. A raised dimple 128, which is perpendicularly placed near the depression 125, is located at the sealing edge of the top of the reservoir 116 and cover plate 111. The dimple 128 directs a jet of oil onto the chain as it runs by the tensioner

100. The jet of oil provides lubrication of the chain without the loss of oil pressure in the tensioner 100. A pair of mounts 126 and 127 attach the cover plate 111 to the tensioner 100.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:

a housing having an exterior surface and a bore extending inwardly from said exterior surface, said bore defining a fluid chamber within said housing;

a hollow piston slidably received within the bore and having an upper end;

a spring biasing the piston in a protruding direction from said bore;

a check valve provided between the fluid chamber and a source of pressurized fluid to permit fluid flow into the fluid chamber while blocking fluid flow in the reverse direction;

a reservoir formed within the interior of the housing to provide oil to the fluid chamber, said reservoir being located between said check valve and said source of pressurized fluid, said reservoir having an interior defined by walls extending downwardly and inwardly into said housing from a reservoir top portion located alone an exterior surface of said housing to a position substantially beneath said housing exterior surface;

a passage in the housing to connect the fluid chamber with the reservoir; and a flat cover plate covering said reservoir, said flat cover plate having a dimple opening at an edge of said cover plate located at the top portion of said reservoir and a depression groove formed continuously along the portion of said cover plate covering said interior of said reservoir.

2. The hydraulic tensioner of claim 1 wherein said depression groove extends downwardly into the interior of the reservoir, said depression groove acting to stiffen the cover plate.

3. The hydraulic tensioner of claim 2 wherein said cover plate has edges defining a length and a width, said depression groove is spaced from the edges of said cover plate.

4. The hydraulic tensioner of claim 3 wherein said depression groove is located along the middle of said cover plate and extends along the length of said cover plate.

5. The hydraulic tensioner of claim 3 wherein said depression groove is located alone the middle of said cover plate and extends along the width of said cover plate.

6. The hydraulic tensioner of claim 5 wherein said cover plate has a rectangular shape defined by said edges.

* * * * *